(12) United States Patent
Lin et al.

(10) Patent No.: US 7,616,172 B2
(45) Date of Patent: Nov. 10, 2009

(54) DISPLAY PANEL HAVING MULTIPLE DISPLAY REGIONS AND CORRESPONDING BACKLIGHT REGIONS AND METHOD OF CONTROLLING THE SAME

(75) Inventors: Chao Lien Lin, Tainan County (TW); Chien-Chih Huang, Tainan County (TW)

(73) Assignee: Chi Mei Optoelectronics Corp., Tainan County (TW)

( * ) Notice: Subject to any disclaimer, the term of this patent is extended or adjusted under 35 U.S.C. 154(b) by 504 days.

(21) Appl. No.: 11/564,987

(22) Filed: Nov. 30, 2006

(65) Prior Publication Data
US 2007/0126691 A1  Jun. 7, 2007

(30) Foreign Application Priority Data
Dec. 1, 2005 (TW) .............................. 94142365 A (51) Int. Cl.
G09G 5/00 (2006.01)
H04N 13/00 (2006.01)

(52) U.S. Cl. .............................. 345/8; 345/102; 348/42
(58) Field of Classification Search ................. 345/7–9, 345/87, 100, 102
See application file for complete search history.

(56) References Cited

U.S. PATENT DOCUMENTS 5,663,831 A * 9/1997 Mashitani et al. ........... 359/463
6,961,045 B2 * 11/2005 Tsao .......................... 345/103

* cited by examiner

*Primary Examiner*—Duc Q Dinh (57) ABSTRACT

In a 3D display having a plurality of display regions and corresponding backlight regions, the image data is sequentially sent to the display regions. The respective light source(s) of the corresponding backlight region is/are turned ON after a response time of each display region, without waiting for a response time or times in the other display regions. The light source(s) is/are then turned OFF after a predetermined time period. The process repeats for further image data.

20 Claims, 9 Drawing Sheets

DISPLAY PANEL HAVING MULTIPLE DISPLAY REGIONS AND CORRESPONDING BACKLIGHT REGIONS AND METHOD OF CONTROLLING THE SAME

RELATED APPLICATIONS

The present application is based on, and claims priority from, TW Application Number. 94142365, filed Dec. 1, 2005, the disclosure of which is hereby incorporated by reference herein in its entirety.

TECHNICAL FIELD

The disclosure relates to a display panel having multiple display regions and corresponding backlight regions, and a method of controlling the same. In particular, methods of increasing brightness in 3D display panels, and more particularly, methods of sequentially displaying images in a plurality of display regions of the display panel are disclosed.

BACKGROUND

A new market that many liquid crystal display (LCD) manufacturers are struggling to break into is the 3D display market, particularly the market of 3D displays that do not require viewers to wear special eyewear to view 3D effects. Current 3D display technology is split into two major branches: spatial differentiation and temporal differentiation. Both technologies operate on the principle of splitting the image signal into two independent signals sent individually to the right eye and the left eye, without requiring extra eyewear to filter the signals. Temporal differentiation is gaining the attention of designers, because it does not reduce resolution and can provide highly refined 3D effects. However, temporal differentiation is limited in that the time required for the LCD to achieve a stable state is relatively long, which makes it a challenge to provide a high brightness image.

Simply speaking, in spatial differentiation, after a power supply turns on, the display panel will set up a micro-optical parallax grate, which is shaped similar to a wooden fence, and has an operating principle similar to polarized 3D glasses. The light rays representing the image are bent by the grate, and the right eye and the left eye see alternating pixels in the same row. The human brain then forms a 3D image from the two different images seen. One disadvantage of spatial differentiation is that it reduces image resolution, because the right eye and the left eye only see one half of the image. For example, if the display panel has a resolution of 800×600 pixels, each eye will see a 400×600 pixel image. The 3D image combined in the brain will also have the reduced resolution of 400×600 pixels.

Figure 1:
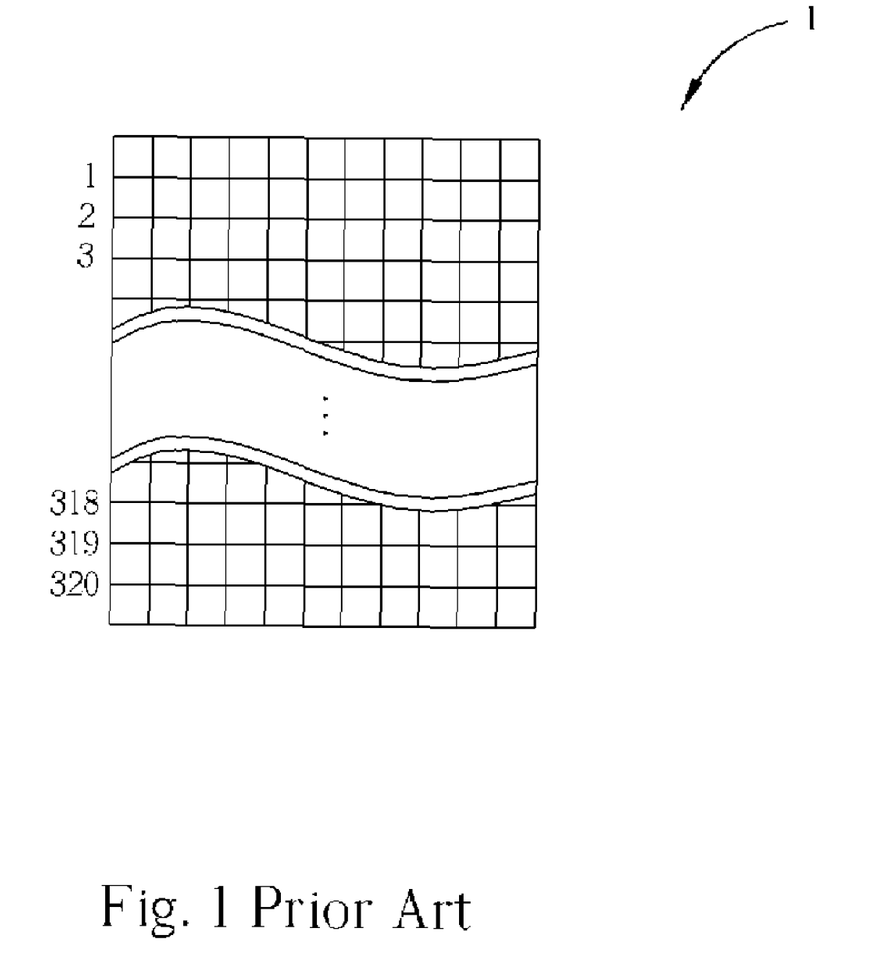
FIG. 1 is a diagram illustrating a display panel according to the prior art.
Figure 2:
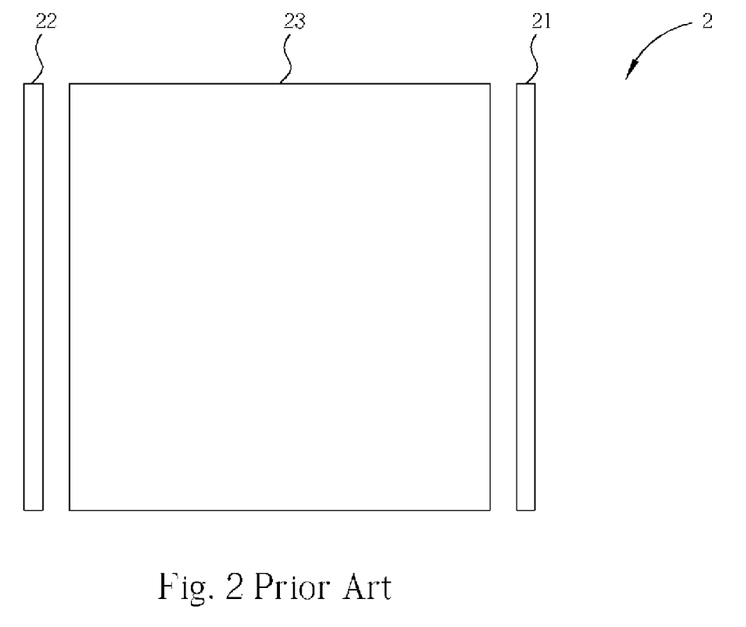
FIG. 2 is a diagram illustrating a backlight module for use with of the display panel of FIG. 1.

The following is a description of the principle of temporal differentiation. FIG. 1 is a diagram of a display panel 1 according to the prior art, where each square represents one image pixel. FIG. 2 is a diagram of a backlight module 2 at an underside of the display panel 1 of FIG. 1. The backlight module 2 comprises light sources 21, 22 on its opposite sides, and a light guide panel 23.

Figure 3:
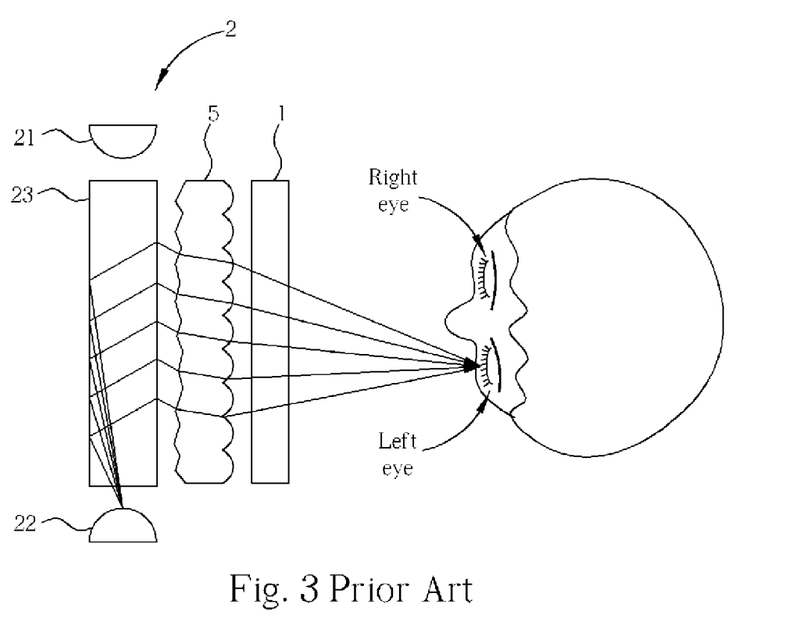
FIG. 3 is a schematic top view of the display panel of FIG. 1 and the backlight module of FIG. 2 in use.

FIG. 3 is a schematic top view of the display panel 1 and the backlight module 2. A micro-lens 5 is positioned between the display panel 1 and the backlight module 2, and is used for directing light rays to the left eye and the right eye, such that the left eye and the right eye can receive individual parallax images. Because the light sources 21, 22 of the backlight module 2 have a special angular arrangement, if the light source 22 is ON, the light rays emitted from the light source 22 will be incident upon the micro-lens 5 through total reflection in the light guide panel 23. The micro-lens 5 can be formed of a convex lens and a prism. As shown in FIG. 3, one side of the micro-lens 5 comprises a plurality of arced faces, and an opposing side of the micro-lens 5 comprises a plurality of corresponding refractive faces shaped like a row of saw teeth. Thus, the micro-lens 5 directs the light rays from the light source 22 and reflected off light guide panel 23 at a specific angle toward the left eye, where the light rays converge. As a result, the left eye receives the left eye parallax image. The same applies to the light source 21 and the right eye signal and parallax image.

Figure 4:
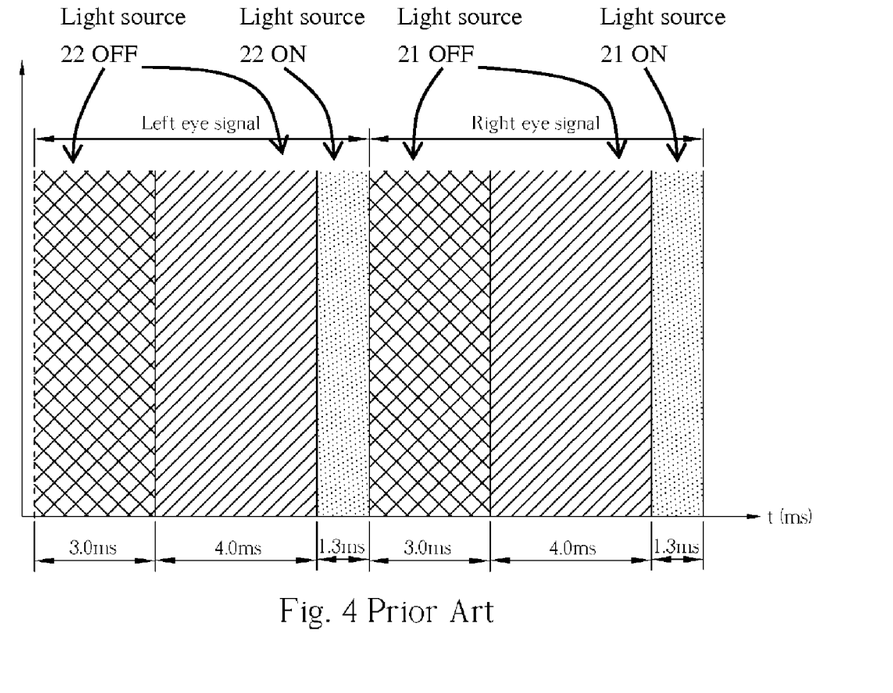
FIG. 4 is a sequence diagram illustrating the conventional method of controlling the display panel of FIG. 1 and the light sources of the backlight module of FIG. 2.

FIG. 4 is a sequence diagram showing a conventional method of controlling the display panel 1 of FIG. 1 and the light sources 21, 22 of the backlight module 2 of FIG. 2. Because the human brain retains images received through the eyes for approximately 16.67 ms, the brain can form a 3D image from the images received if the right eye signal and the left eye signal are sent to the right eye and the left eye of the observer, such that the right eye and the left eye receive the right eye parallax image and the left eye parallax image, respectively, within 16.67 ms. In other words, the frame time distributed to the left eye signal and the right eye signal is only 8.3 ms each.

In the sequence diagram of FIG. 4, the left eye signal is sent first, and the right eye signal is sent second. For example, the approximate time required for sending the image from the 1st scan line to the last, e.g., $320^{th}$, scan line is 3 ms. After the data corresponding to the 320th scan line has been sent, the entire display panel 1 must wait for the liquid crystals to settle, for approximately 4 ms, before the light source 22 of the backlight module 2 can be turned ON, so as to allow the left eye to receive the left eye parallax image. After the light source 22 turns OFF, the process is repeated for displaying the right eye parallax image. To prevent the right eye parallax image and the left eye parallax image from interfering with each other, and thus degrading the desired 3D visual effect, the light sources 21, 22 must wait for the data of the entire display panel 1 to finish updating (i.e., respond to the received image data) before they can be turned ON. Then, the light sources must be turned OFF before the next parallax image begins updating. In other words, the light source 22 must be turned OFF before sending the right eye signal. Likewise, the light source 21 must be turned OFF before updating the next (left eye) parallax image. Hence, the proportion of time that the light sources 21, 22 are ON for displaying the parallax images compared to the time frame period is quite small. For example, after deducting 3 ms required for sending the image signal and 4 ms required for allowing the liquid crystals to respond to the received image signal, the amount of time the light sources 21, 22 are actually ON is only about 1.3 ms. Within one period, the proportion is only about 1.3/8.3, which means that the image brightness will be insufficient. Thus, high power light sources must be used to provide the needed brightness within the short period of time, which causes a disadvantage in power consumption.

SUMMARY

According to an aspect of the present invention, a display is provided having a plurality of display regions and corresponding backlight regions. The image data is sequentially sent to the display regions. The respective light source(s) of the corresponding backlight region is/are turned ON after a response time of each display region, without waiting for a response time or times in the other display regions. The light source(s) is/are then turned OFF after a predetermined time period. The process repeats for further image data.

According to a further aspect of the present invention, in a method of sequentially displaying 3D image data in a plurality of display regions of a display panel, a first image signal is sent to control a first display region of the display panel, and after that, a second image signal is sent to control a second display region of the display panel. While sending the second image signal to control the second display region of the display panel, the first display region is allowed to respond to the first image signal. After allowing the first display region to respond to the first image signal and while allowing the second display region to respond to the second image signal, a first light source corresponding to the first display region is turned ON. After allowing the second display region to respond to the second image signal, a second light source corresponding to the second display region is turned ON. While the second light source is ON and after the first light source has been ON for a predetermined period of time, the first light source is turned OFF. While the second light source is ON and after the first light source has been turned OFF, a third image signal is sent to control the first display region. After the sending of the third image signal has completed, the first display region is allowed to respond to the third image signal. After allowing the first display region to respond to the third image signal, a third light source corresponding to the first display region is turned ON.

According to another aspect of the present invention, in a method of sequentially displaying 3D image data in a plurality of display regions of a display panel, a first image signal is sent to a first display region of the display panel to control the first display region. After sending the first image signal to the first display region, a second image signal is sent to a second display region of the display panel to control the second display region. The process then waits for a first delay period after completing the sending of the first image signal, then turns ON a first light source corresponding to the first display region. The process waits for a second delay period after completing the sending of the second image signal, then turns ON a second light source corresponding to the second display region. After the first light source has been ON for a predetermined period of time, the first light source is turned OFF and a third image signal is sent to the first display region. After the second light source has been ON for a predetermined period of time, the second light source is turned OFF. After completing the sending of the third image signal, a fourth image signal is sent to the second display region. The process waits for a third delay period after completing the sending of the third image signal, then turns ON a third light source corresponding to the first display region. The process waits for a fourth delay period after completing the sending of the fourth image signal, then turns ON a fourth light source corresponding to the second display region.

According to yet another aspect of the present invention, a display for generating 3D image effects includes a display panel and a backlight module positioned behind the display panel. The backlight module includes a first light source positioned at a first side of a first backlight region of the backlight module for lighting the first backlight region from the first side of the first backlight region; a second light source positioned at a second side of the first backlight region of the backlight module for lighting the first backlight region from the second side of the first backlight region; a third light source positioned at a first side of a second backlight region of the backlight module for lighting the second backlight region from the first side of the second backlight region; and a fourth light source positioned at a second side of the second backlight region of the backlight module for lighting the second backlight region from the second side of the second backlight region. The display further includes at least a light guide element for guiding light rays from the first light source and the third light source to a first focal point, and guiding light rays from the second light source and the fourth light source to a second focal point.

These and other objectives of the present invention will no doubt become obvious to those of ordinary skill in the art after reading the following detailed description of the preferred embodiment that is illustrated in the various figures and drawings.

DETAILED DESCRIPTION

Figure 5:
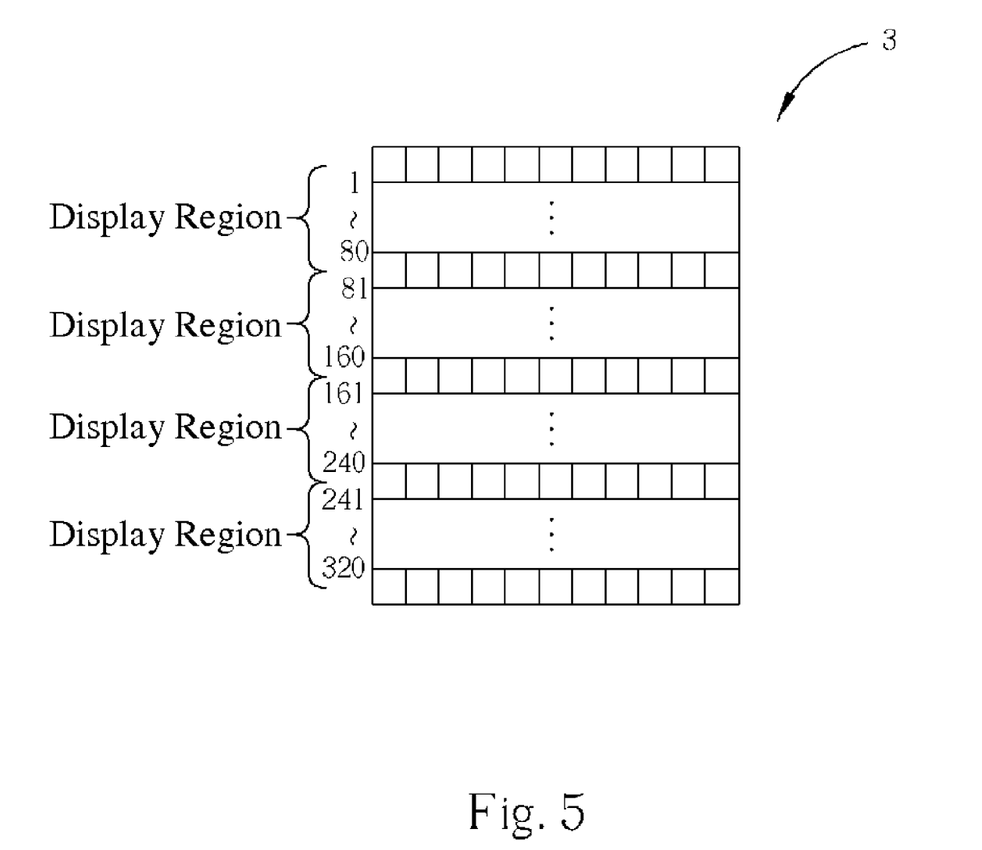
FIG. 5 is a diagram illustrating a display panel according to an embodiment of the present invention.
Figure 6:
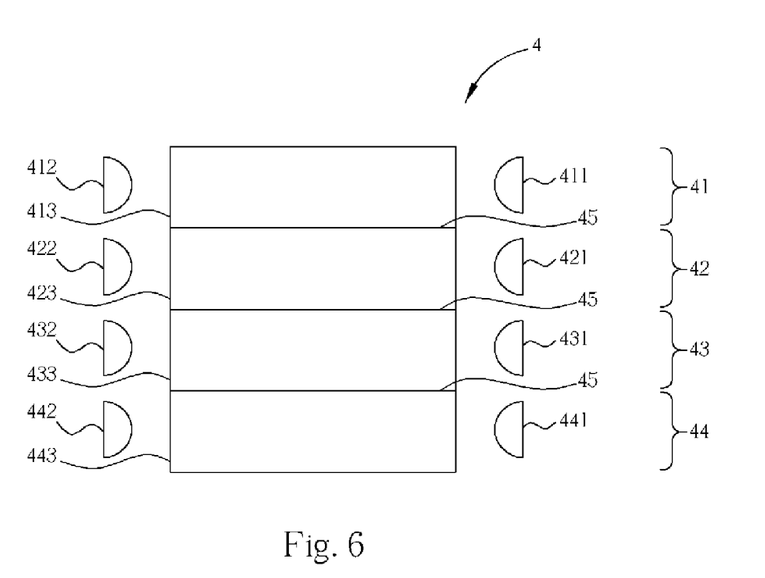
FIG. 6 is a diagram of a backlight module for use with the display panel of FIG. 5.

FIG. 5 is a diagram illustrating a display panel 3 according to an embodiment of the present invention, and FIG. 6 is a diagram illustrating a backlight module 4 for use with, e.g., positioned under or at the rear of, the display panel 3 of FIG. 5. The display panel 3 is split into a number of display regions, for example, four display regions 1-4. Likewise, the backlight module 4 is split into a corresponding number of backlight regions, e.g., 41-44, so that each display region 1-4 corresponds to a backlight region 41-44, respectively. In the specific embodiment of FIG. 5, display region 1 corresponds to the first 80 scan lines (i.e., scan lines 1 to 80) of the display panel 3, display region 2 corresponds to the second 80 scan lines (i.e., scan lines 81 to 160) of the display panel 3 and so on. As shown in FIG. 6, a light blocking panel 45 is positioned, in accordance with an embodiment, between each pair of the adjacent backlight regions 41-44 for preventing light ray interference between neighboring backlight regions 41-44. In addition, each backlight region 41-44 has a corresponding light guide panel 413, 423, 433, 443 separated one from another by the light blocking panels 45. The backlight module 4 further includes light sources that are located on opposite sides of each backlight region 41-44. In the specific embodiment depicted in FIG. 6, two light sources 411, 412 are located on opposite sides of the backlight region 41, two light sources 421, 422 are located on opposite sides of the backlight region 42, two light sources 431, 432 are located on opposite sides of the backlight region 43, and two light sources 441, 442 are located on opposite sides of the backlight region 44. Other arrangements are not excluded. For example, the backlight module 4 and the display panel 3 can be divided into any desirable number of backlight/display regions. Further, the display regions (and hence the corresponding backlight regions) need not be identical in size. For example, the edge display regions, e.g., display regions 1 and 4, may be larger (i.e., have more scan lines) or smaller (i.e., have less scan lines) than the central display regions, e.g., display regions 2 and 3, depending on the applications.

Figure 7:
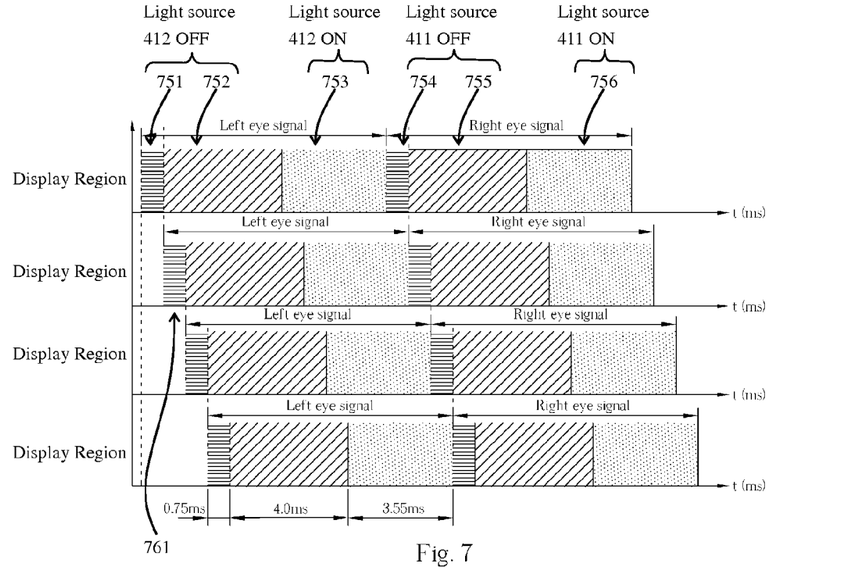
FIGS. 7 and 8 are sequence diagrams illustrating various methods of controlling the display panel of FIG. 5 and the light sources of the backlight module of FIG. 6 in accordance with several embodiments of the present invention.

FIG. 7 is a sequence diagram illustrating a method of controlling the display panel 3 of FIG. 5 and the light sources of the backlight module 4 of FIG. 6 in accordance with an embodiment. In this embodiment, the display data is first transmitted to display region 1, then to display region 2, and so on. In the specific embodiment of FIG. 7, the left eye signal in the display data is received first, followed by the right eye signal. In particular, during a time interval 751, the display region 1 receives the data in the left eye signal. For example, if the display region 1 includes 80 scan lines, the time interval 751 required for scanning the 80 scan lines (or for receiving the data in the left eye signal) is about 0.75 ms. The time interval 751 is followed by another time interval 752 which is about, e.g., 4 ms. The time interval 752 is necessary for liquid crystals in the region 1 to settle, and is also known as the response time of liquid crystals or LCDs. The time interval 752 depends on the speed at which the liquid crystals react to an electrical field generated by the left eye signal applied to the scan lines of the display region 1. During the time intervals 751, 752, the corresponding light source 412, and of course, the opposite light source 411, are turned OFF. However, after the expiration of the time interval 752, the "left eye" light source 412 of the display region 1 can be turned ON so that the received left eye signal can be displayed to the viewer. The light source 412 is thus ON for a time interval 753 of about 3.55 ms, which is the difference of the image frame period (8.3 ms), the time 751 required to transmit the image signal (0.75 ms), and the response time 752 (4 ms). Then, the light source 412 is turned OFF before the display region 1 can continue to receive the right eye signal. Again, a time interval 754 is required for receiving the data of the right eye signal (approximately 0.75 ms), and followed by another time interval 755 corresponding to the response time of the liquid crystals of the display region 1 (approximately 4 ms). After that, the light source 411 of the display region 1 can be turned ON so that the received right eye signal can be displayed to the viewer. The light source 411 is thus ON for a time interval 756 of about 3.55 ms. This control process applies to each of the remaining display regions 2-4, and thus further description is omitted.

It should be noted that in the specific embodiment of FIG. 7, the display regions 1-4 are sequentially scanned, i.e., the data is first transmitted to the display region 1, then to the display region 2, and so on. Thus, the time interval 761 during which the display region 2 receives data will commence after the time interval 751 during which the display region 1 receives data. In other words, the time interval 761 starts 0.75 ms later than the time interval 751. The same applies to the display regions 3-4.

Due to the fact that none of the display regions 1-4 need to wait for the liquid crystals of the other regions to settle, i.e., the display regions 1-4 can be scanned, e.g., at 751, 761, during the wait time, or response time, of the other display regions, each of the light sources corresponding to the respective backlight modules 41-44 can be ON for about 3.55 ms, which is much longer than the ON time of light sources 21, 22 of the prior art shown in FIG. 4. The method in accordance with the embodiment of the present invention increases the utility rate of the light sources to approximately 3.55/8.3, which is approximately three times higher than the prior art, and greatly increases the brightness of the image displayed. In other words, by splitting the display panel 3 into a number of display regions, and controlling the light sources of the corresponding number of backlight regions of the backlight module 4, the amount of "waste" time each display region must spend waiting for the other display regions to receive and respond to the image data can be reduced, thereby increasing the ON time of the respective light sources.

Figure 8:
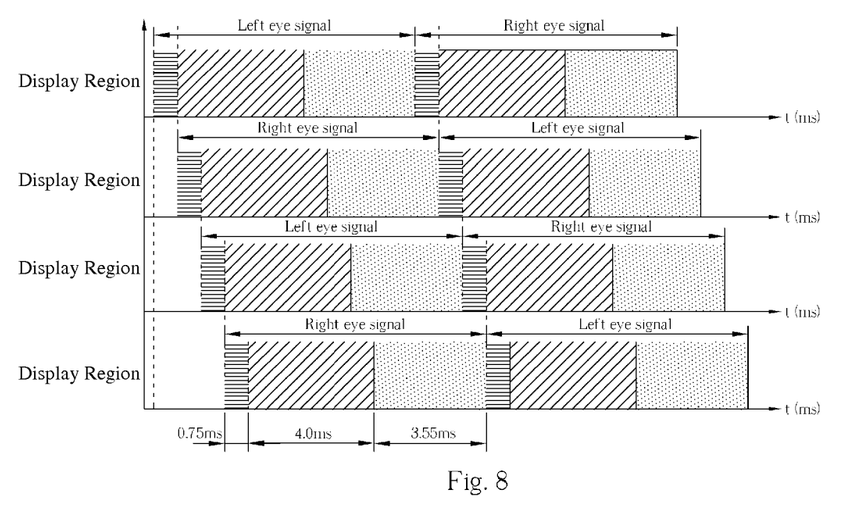

Of course, the above disclosed method of data transfer is not limited to the specific embodiment disclosed in FIG. 7. Since the left and right eye signals only need to be transmitted within 16.63 ms or lower, the right eye signal could be sent to the display regions 1-4 before the left eye signal in all display regions. Alternatively, as shown in FIG. 8, transmission of the left eye signal could precede transmission of the right eye signal in some display regions, e.g., display regions 1 and 3 while trailing transmission of the right eye signal in other display regions, e.g., display regions 2 and 4, or vise versa. Any of these or other transmission methods could be used to achieve the goal of displaying desired 3D effects.

Additionally, the image frame period 8.3 ms is now required for transmitting the image signal, allowing the liquid crystals to respond, and turning ON the respective light source of one single display region, rather than the entire disclose panel as in the prior art. The shorter the scanning time, the longer the ON time and/or the response time can be, i.e., the brighter the LCD display can be and/or the slower liquid crystals can be used. Thus, the disclosed method is not limited to applications using liquid crystals with a relatively fast response time. This means, liquid crystals with relatively slower response time can be used in accordance with the disclosed method in 3D LCD displays while still providing the same or better brightness compared to the prior art.

Figure 9:
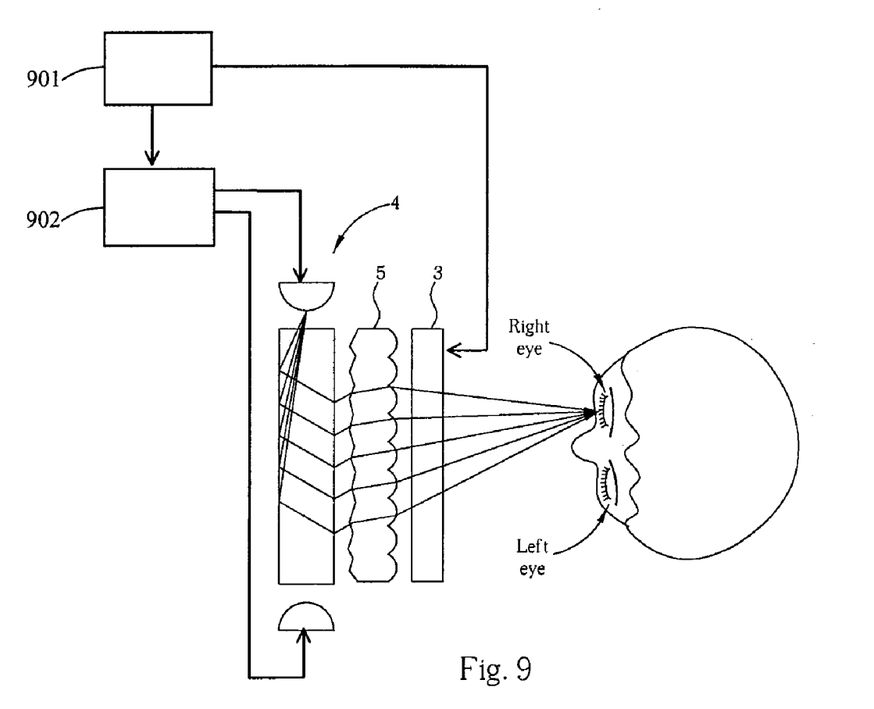
FIG. 9 is a schematic top view of the display panel and the backlight module in accordance with embodiments of the present invention in use.

FIG. 9 is a schematic top view of the display panel 3 and the backlight module 4. In an embodiment, a micro-lens 5 is located between the display panel 3 and the backlight module 4, and is used for directing light rays to the left eye and the right eye of the observer, such that the each eye can receive an individual parallax image. The micro-lens 5 can be formed of a convex lens and a prism. As shown in FIG. 9, one side of the micro-lens 5 comprises a plurality of arced faces, and another side of the micro-lens 5 comprises a plurality of refractive faces shaped like a row of saw teeth. An image data control circuit 901 is connected to display panel 3 for applying the image signal thereto. A backlight control circuit 902 is connected to the light sources of the backlight module 4. In an embodiment, the image signal, or a synchronizing signal based on the image signal, can also be fed from the image data control circuit 901 to the backlight control circuit 902 for controlling the ON time of the light sources. The control circuits 901, 902 can be combined into a single controller of the LCD display or split into several smaller controllers depending on applications. The methods disclosed above with respect to various embodiments of the present invention can be implemented in control circuits 901, 902 or their equivalents as hardware, software or both.

Compared to the prior art, the disclosed embodiments of the present invention provide a 3D effect displaying method and device that can effectively increase the utility rate of the light sources, and whereby increase the brightness of the displayed picture.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of sequentially displaying 3D image data in a plurality of display regions of a display panel, said method comprising:

sending a first image signal to control a first display region of the display panel, and after that, sending a second image signal to control a second display region of the display panel;

while sending the second image signal to control the second display region of the display panel, allowing the first display region to respond to the first image signal;

after allowing the first display region to respond to the first image signal and while allowing the second display region to respond to the second image signal, turning ON a first light source corresponding to the first display region;

after allowing the second display region to respond to the second image signal, turning ON a second light source corresponding to the second display region;

while the second light source is ON and after the first light source has been ON for a predetermined period of time, turning OFF the first light source;

while the second light source is ON and after the first light source has been turned OFF, sending a third image signal to control the first display region;

after the sending of the third image signal has completed, allowing the first display region to respond to the third image signal; and after allowing the first display region to respond to the third image signal, turning ON a third light source corresponding to the first display region.

2. The method of claim 1, wherein the second light source corresponding to the second display region is located at the same side as the first light source corresponding to the first display region.

3. The method of claim 1, wherein the second light source corresponding to the second display region is located at an opposite side from the first light source corresponding to the first display region.

4. A method of sequentially displaying 3D image data in a plurality of display regions of a display panel, said method comprising:

sending a first image signal to a first display region of the display panel to control the first display region;

after sending the first image signal to the first display region, sending a second image signal to a second display region of the display panel to control the second display region;

waiting for a first delay period after completing the sending of the first image signal, then turning ON a first light source corresponding to the first display region;

waiting for a second delay period after completing the sending of the second image signal, then turning ON a second light source corresponding to the second display region;

after the first light source has been ON for a predetermined period of time, turning OFF the first light source and sending a third image signal to the first display region;

after the second light source has been ON for a predetermined period of time, turning OFF the second light source;

after completing the sending of the third image signal, sending a fourth image signal to the second display region;

waiting for a third delay period after completing the sending of the third image signal, then turning ON a third light source corresponding to the first display region;

waiting for a fourth delay period after completing the sending of the fourth image signal, then turning ON a fourth light source corresponding to the second display region.

5. The method of claim 4, wherein the display panel is a liquid crystal display (LCD) panel, and the first delay period, the second delay period, the third delay period, and the fourth delay period are a response time required for liquid crystals of the LCD panel.

6. The method of claim 4, wherein the first image signal corresponds to a parallax image intended for the left eye of a viewer and the third image signal corresponds to a parallax image intended for the right eye of the viewer.

7. The method of claim 6, wherein the first light source provides light rays intended for the left eye, and the third light source provides light rays intended for the right eye.

8. The method of claim 4, wherein the first image signal corresponds to a parallax image intended for the right eye of a viewer, and the third image signal corresponds to a parallax image intended for the left eye of the viewer.

9. The method of claim 8, wherein the first light source provides light rays intended for the right eye, and the third light source provides light rays intended for the left eye.

10. The method of claim 4, wherein the second image signal is a left eye image signal, and the fourth image signal is a right eye image signal.

11. The method of claim 10, wherein the second light source provides light rays intended for the left eye, and the fourth light source provides light rays intended for the right eye.

12. The method of claim 4, wherein the second image signal is a right eye image signal, and the fourth image signal is a left eye image signal.

13. The method of claim 12, wherein the second light source provides light rays intended for the right eye, and the fourth light source provides light rays intended for the left eye.

14. A display for generating 3D image effects comprising:

a display panel;

a backlight module positioned behind the display panel, and comprising:

a first light source positioned at a first side of a first backlight region of the backlight module for lighting the first backlight region from the first side of the first backlight region;

a second light source positioned at a second side of the first backlight region of the backlight module for lighting the first backlight region from the second side of the first backlight region;

a third light source positioned at a first side of a second backlight region of the backlight module for lighting the second backlight region from the first side of the second backlight region; and a fourth light source positioned at a second side of the second backlight region of the backlight module for lighting the second backlight region from the second side of the second backlight region; and at least a light guide element for guiding light rays from the first light source and the third light source to a first focal point, and guiding light rays from the second light source and the fourth light source to a second focal point.

15. The display of claim 14, further comprising a blocking panel positioned between the first backlight region and the second backlight region for preventing light ray interference between the first backlight region and the second backlight region.

16. The display of claim 14, wherein the first focal point corresponds to a visible range of an observer's left eye and the second focal point corresponds to a visible range of the observer's right eye.

17. The display of claim 14, wherein the at least one light guide element comprises a light guide plate in each of the backlight regions and a micro-lens between the backlight module and the display panel.

18. The display of claim 17, wherein a side of the micro-lens comprises a plurality of arced faces, and another side of the micro-lens comprises a plurality of refractive faces defining a shape of a row of saw teeth.

19. The display of claim 14, further comprising a control circuit connected to the display panel and the backlight module, said control circuit being configure for sequentially sending image signals to first and second display regions corresponding to the first and second backlight regions, respectively, after a response time of each of the display regions and without waiting for a response time in the other display region, turning ON the light source that corresponds to the image data received at the display region, and turning OFF the light source after the light source has been ON for a predetermined time period.

20. The method of claim 4, further comprising determining an ON time of each of the light sources based on a number of scan lines in the respective display region.

* * * * *